(12) United States Patent
Stone

(10) Patent No.: US 10,167,886 B2
(45) Date of Patent: Jan. 1, 2019

(54) SECUREMENT CLIP FOR PIPE AND SCAFFOLD ENGAGED FABRIC

(71) Applicant: Carl Stone, Piedmont, SC (US)

(72) Inventor: Carl Stone, Piedmont, SC (US)

( * ) Notice: Subject to any disclaimer, the term of this patent is extended or adjusted under 35 U.S.C. 154(b) by 0 days.

(21) Appl. No.: 15/826,511

(22) Filed: Nov. 29, 2017

(65) Prior Publication Data

US 2018/0347606 A1 Dec. 6, 2018

Related U.S. Application Data

(60) Provisional application No. 62/513,343, filed on May 31, 2017.

(51) Int. Cl.
| | |
|---|---|
| *F16B 2/06* | (2006.01) |
| *F16B 2/22* | (2006.01) |
| *F16B 5/06* | (2006.01) |
| *B25G 1/10* | (2006.01) |
| *E04G 5/12* | (2006.01) |

(52) U.S. Cl.
CPC .............. *F16B 5/0692* (2013.01); *F16B 2/22* (2013.01); *E04G 5/12* (2013.01); *Y10T 24/44769* (2015.01); *Y10T 24/44923* (2015.01)

(58) Field of Classification Search
CPC .......... F16B 2/22; F16B 5/0692; B25G 1/102; Y10T 24/4406; Y10T 24/44274; Y10T 24/44282; Y10T 24/44376; Y10T 24/44769; Y10T 24/44923; Y10T 24/44855; Y10T 16/498

USPC ......................................... 16/422, 426, 110.1
See application file for complete search history.

(56) References Cited

U.S. PATENT DOCUMENTS

| | | | | |
|---|---|---|---|---|
| 184,599 | A * | 11/1876 | Ehrhardt | F16B 5/0692 24/31 F |
| 3,458,110 | A * | 7/1969 | Goldman | B65D 5/069 229/125.04 |
| 5,752,297 | A * | 5/1998 | Ramey | E04H 15/644 24/460 |
| 8,231,186 | B1 * | 7/2012 | Gilbert | 312/184 |
| 2007/0000100 | A1 * | 1/2007 | Smith | A47C 21/022 24/460 |
| 2008/0164381 | A1 * | 7/2008 | Fleischman | A47C 1/14 248/74.2 |
| 2010/0096094 | A1 * | 4/2010 | Boston | A01G 9/22 160/395 |
| 2017/0114809 | A1 * | 4/2017 | Stickelberger | F16B 2/22 |

* cited by examiner

*Primary Examiner* — Robert Sandy
*Assistant Examiner* — Michael S Lee
(74) *Attorney, Agent, or Firm* — Donn K. Harms

(57) ABSTRACT

A clip configured for compressive engagement of fabric to pipe or similar elongated members such as those of a scaffold. The clip has a body with opposing sidewalls separated by a gap. The sidewalls are formed of elastic or flexible material which will temporarily deflect to temporarily increase the diameter of the gap, to allow passage of the pipe through the gap. The sidewalls thereafter return to the original position wherein interior surfaces of the sidewalls and an axial cavity of the body compressively engage with the pipe and any fabric adjacent thereto to hold the fabric in a compressive, sandwiched engagement between the clip and the pipe.

4 Claims, 2 Drawing Sheets

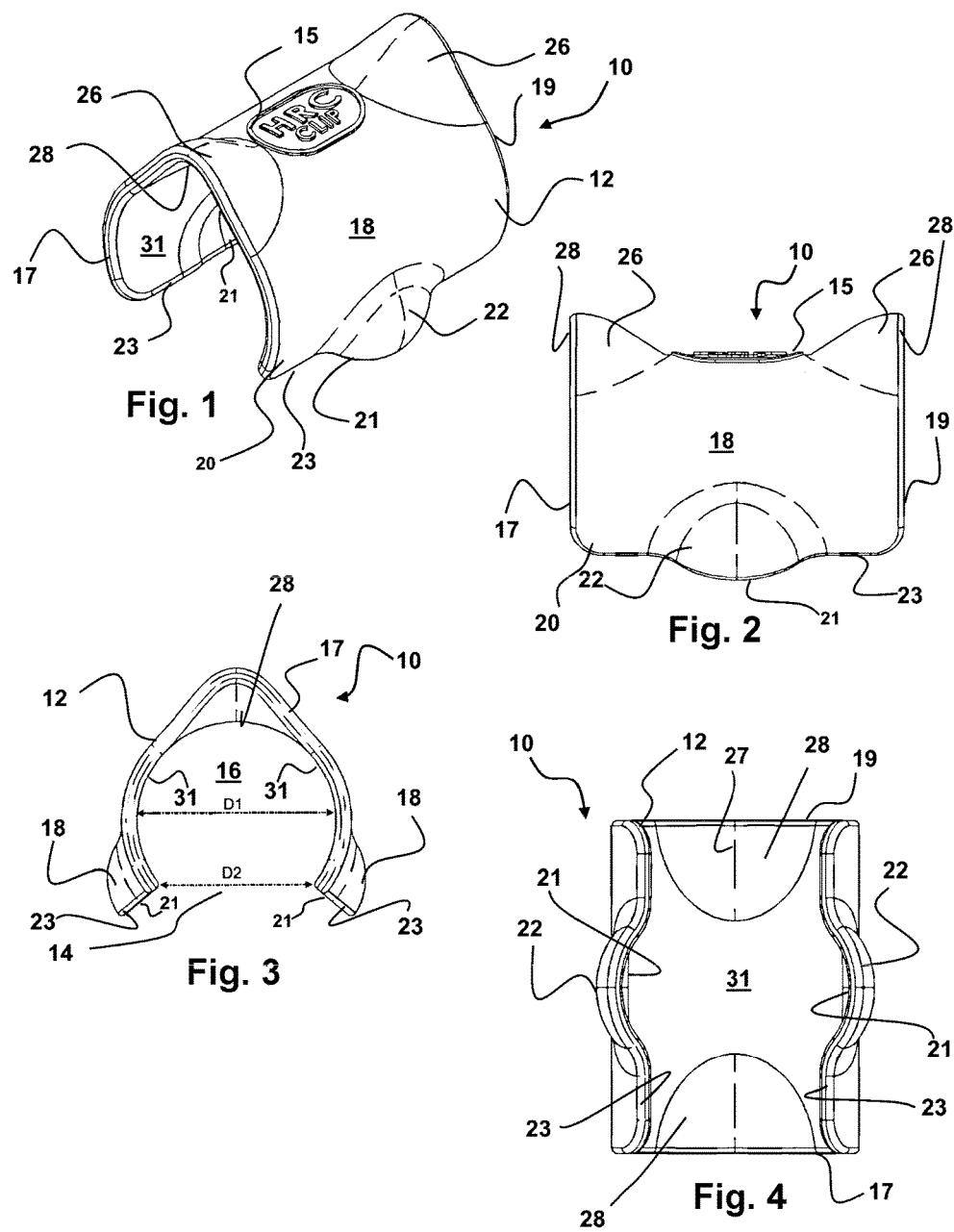

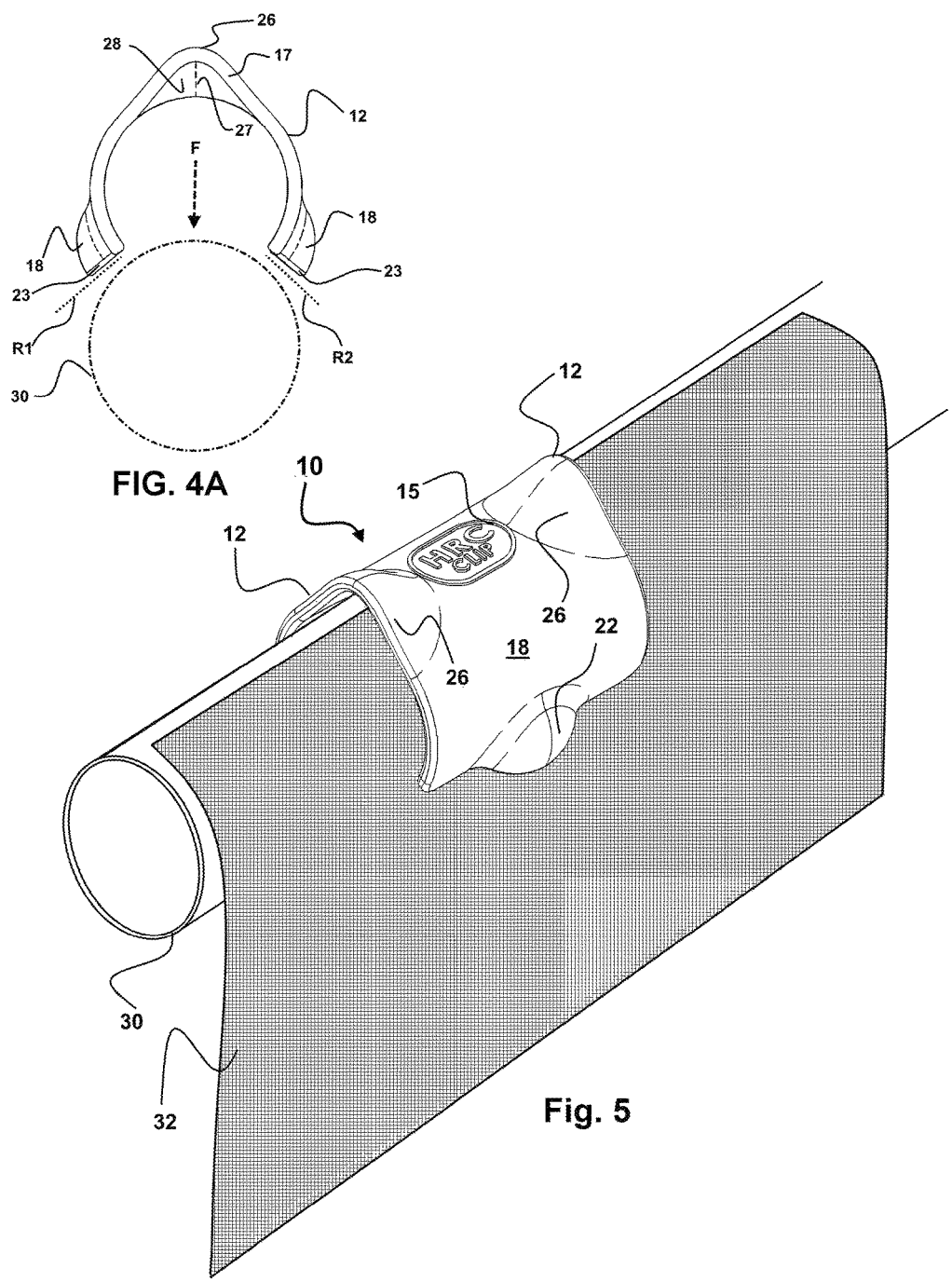

SECUREMENT CLIP FOR PIPE AND SCAFFOLD ENGAGED FABRIC

This application claims priority to U.S. Provisional Patent Application Ser. No. 62/513,343 filed on May 31, 2017, which is incorporated herein in its entirety by this reference thereto.

BACKGROUND OF THE INVENTION

1. Field of the Invention

The present invention relates generally to the securement of fabric to scaffolds and pipes. More particularly, it relates to a clip providing a compressive engagement of fabric used on scaffold structures and the like to quickly and securely engage the fabric to cross members.

2. Prior Art

In the construction and maintenance industry, large scaffold structures are frequently erected around buildings and other structures during construction, or during rehabilitation or maintenance of the structure. Such scaffold structures frequently are erected to a significant height around the building or structure to provide workers access to the exterior thereof during a project.

During such construction projects where large scaffold structures are erected, there is also a frequent need to cover the scaffold structures on an exterior side thereof which is opposite the side of the scaffold adjacent the exterior of the building or other structure the scaffolding surrounds. Such fabric is engaged for different purposes such as wind protection for the workers, over-spray protection for buildings and people surrounding the job site when painting, advertising, preventing dropped objects from falling to the ground, or simply covering the scaffold to make it less of an eyesore.

Conventionally, large sheets of fabric employed for this task are engaged to the horizontally and vertically disposed tubes forming the scaffold structure. However, such fabric installations are a tedious process where workers must use wire, zip fasteners, rope, or other such fasteners, which are threaded through openings in the perimeter of the large fabric sheets, or through the fabric itself, and around the members forming the structure.

Such an installation of scaffold covering fabric can take many man hours and is, as such, costly in both time and for the fabric covering itself. Further, in many installations of such fabric coverings, the wire or ties or rope holding the fabric perimeter to various tubes of the scaffold structure has a tendency to damage the fabric sheets. This can be caused where holes are simply punched through the fabric sheets for the wire, ties or ropes. Damage can also be caused by movement of the fabric in wind and weather which causes the wire or tie to wear through the fabric surrounding the hole or grommet through which it is engaged.

Still further, during disassembly of the scaffold structure, the fabric covering must be removed. The removal process can take an equal or increased time in labor hours since each of the cinched wires or zip ties or other connectors must be removed, and they are not easily visible due to their small size and erratic placement through the fabric to securement on the underlaying structure.

The system herein disclosed provides a highly visible clip which is both easily engaged and disengaged from the members such as pipe and tubing forming the underlying scaffold structure. The clip is configured with an interior diameter sized equal to or slightly smaller than the exterior diameter of the pipe or tubing to which the fabric material is to be engaged. Once engaged the clip provides a highly secure, compressive, sandwiched engagement of a portion of the fabric sheet in-between the exterior of the pipe or tubing and the biased compressive contact with the interior of the clip.

On opposing side edges of the perimeter of the clip are preferably positioned projections or curved portions in the surface of the perimeter edge of the clip. These projections are configured for easy finger engagement by users, and which provide a curved portion or extension of one or both lower edges of the clip. Further, the projections are adapted to provide mechanical advantage when the user slides the clip over the fabric and the exterior of the pipe. The clip can thus, be easily engaged by pressing upon the top surface while holding opposing end portions and can be easily removed by pulling of the hand with fingers engaged on opposing projecting portions. Additional curved portions may also be positioned on one or opposing sides of a central portion of the clip which, once engaged, is positioned on a top or exposed area of the underlying pipe or tubing.

The forgoing examples of related art as to fabric engagement to scaffolds, and limitations related therewith, are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art with regard to fabric engagement to the tubing or pipe which are engaged with fittings to form scaffolds and railings, through the provision of an easily engaged clip. The clip in an engaged configuration sandwiches portions of fabric sheets in a compressive, sandwiched engagement of the fabric in-between an interior surface of the clip and an exterior surface of the underlying pipe, tube, or rail. While the term pipe is employed herein to describe the member to which the clip is adapted to engage, it should not be interpreted to be limiting in any fashion. The clip herein can be adapted to engage any elongated member of any shape and diameter.

The clip has a substantially U-shaped body with an exterior surface and an interior surface adapted to contact and compressibly hold fabric to an underlying member such as the pipe or tubing of a scaffold. The body of the clip has at least one and preferably a first pair of opposing projections formed at opposing edges defining an opening on an open end of the body of the clip. While one such projection will afford the user a grip for removal of the clip, preferably a pair of opposing projections is provided for increased utility as such provides two ledges or grips, and can be formed to form opposing ramps to aid in installation on a pipe.

This first pair of projections is employable both to spread the two sides of the clip apart during engagement on a tube and can also be gripped for removal of the clip when pulling from the tube. During a spreading or expansion of the opening of the clip, when engaging it over fabric and to an underlying member, the projections provide contact surfaces extending a distance beyond the diameter of the clip, and contact the fabric and pipe in a fashion providing mechanical advantage during a pushing of the clip into a compressive, sandwiched engagement with the fabric and over the underlying pipe or tubing.

At a central area of the body of the clip, opposite the open end, are preferably located secondary projecting portions in opposing positions along the perimeter edge of the body of the clip in this central area. While the clip will function without the secondary projecting portions, it was found that these secondary projecting portions form cavities between the surface of the fabric or the tubing or pipe, and the perimeter edge of the body of the clip. During removal of the clip for disengagement of the underlying fabric, these opposing cavities provide opposing grips or ledges which are easily contacted by the thumb and fingers of a user. So engaged with the thumb and a finger of the user, the ledges formed by the opposing cavities provide a second means to pull the clip from a compressed engagement on a pipe during removal, in addition to that provided by the first pair of opposing cavities.

The clip may be formed of metal, or more preferably a flexible or polymeric material such as nylon, polyethylene, or polyester which is elastic in nature and will impart a biasing force to return to the original shape of the body when expanded for engagement or removal of the clip. The material forming the clip preferably will have a high UV light resistance so that it will last when exposed to sunlight for long terms.

With respect to the above description, before explaining at least one preferred embodiment of the herein disclosed fabric securing clip in detail, it is to be understood that the disclosed fabric clip system herein is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed clip for fabric engagement to tubes and pipes. It is important, therefore, that the claims be regarded as including such equivalent construction and methodology insofar as they do not depart from the spirit and scope of the present invention.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features of the invention. It is intended that the embodiments and figures disclosed herein are to be considered illustrative rather than limiting. In the drawings:

FIG. 1 shows a view of a perspective view of the clip herein showing the U-shaped body having an open side defined by a gap running opposite to a central portion of the body, and an axial passage running therethrough.

FIG. 2 shows a side view of FIG. 1.

FIG. 3 shows an end view of the U-shaped body and shows the axial passage running through the clip which has an interior diameter D1 equal to or smaller than an exterior diameter of a pipe to which the body engages, and showing a gap on the open side which is smaller than the diameter.

FIG. 4 shows a bottom side view of the clip, showing the gap upon the open side of the body, and showing opposing projections formed in the perimeter edge of the clip on at least one and preferably opposite edges of the open side.

FIG. 4A depicts the installation of the clip upon a member such as a pipe or tube, showing that a downward force on the body of the clip will cause contact of opposing ramps formed by projecting portions on both sides of the body, which provide mechanical advantage to flex the sidewalls temporarily outward as the clip body slides to an engagement on the pipe.

FIG. 5 shows the clip herein in an as-used or engaged position, wherein the body is positioned in a compressive sandwiched engagement of a portion of fabric between the interior surface of body of the clip and the exterior surface of the pipe or tubing.

Other aspects of the present invention will be more readily understood when considered in conjunction with the accompanying drawings, and the following detailed description, neither of which should be considered limiting.

DETAILED DESCRIPTION OF THE PREFERRED

Embodiments of the Invention

In this description, the directional prepositions of up, upwardly, down, downwardly, front, back, top, upper, bottom, lower, left, right and other such terms refer to the nose engagement device as it is oriented and appears in the drawings and are used for convenience only; they are not intended to be limiting or to imply that the device has to be used or positioned in any particular orientation.

Now referring to drawings in FIGS. 1-5 wherein similar components are identified by like reference numerals, there can be seen in FIG. 1 a perspective view of the clip 10 which has a body 12 which is substantially U-shaped. By substantially U-shaped is meant that the body 12 is formed of any exterior shape but has a curved interior surface 31 running across a center portion 15 of the body 12 and both sidewalls 18 extending therefrom, and has a gap 14 in-between the distal ends 23 of the two sidewalls 18. This gap 14 defines an opening or open side of the clip 10 opposite the central portion 15 of the body 12 and at the distal ends 13 of both of the sidewalls 18. An axial passage 16 communicates through the body 12 of the clip from a first edge 17 to a second edge 19 of the body 12.

Shown in FIG. 2 is a side view of the body 12 of the clip 10, showing one curved sidewall 18 having a curved interior surface 31 wherein the sidewall 18 extends from the central portion 15 to a distal edge 23 at a lower end 20 of the sidewall 18. At this lower end 20 in a central position in-between the first edge 17 and second edge 19 of the body on one sidewall 18, but preferably both sidewalls 18, is formed a projecting portion 22 which has a cavity forming a ledge 21 on an underside. This projecting portion 22 is formed by an outward curve or projection of the distal edge 23 of the sidewall 18 and a portion of the sidewall 18 adjacent thereto. Each of the formed ledge 21 on the lower ends 20 of both sidewalls 18, provide a gripping location for the fingers of a user. As noted, the clip can have only one such projection portion 22 which will define one ledge 21 or gripping location for removal of the body 12 of the clip from engagement over a tube or pipe 30 as in FIG. 5. However, preferred is two opposing such projection portions 22 which form opposing ledges 21 or gripping locations for the thumb and fingers of the user during such removal.

During experimentation it was also found that two such projection portions 22, formed by curved areas on opposing positions on the sidewalls 18, are preferred, because such a configuration provided a significant mechanical advantage during clip installation to the installed position on a member such as a pipe 30 shown in FIG. 5. This is because, as can be seen in FIG. 3 and FIG. 4, the projecting portion 22 formed by the curve of the distal end 23 and adjacent portions of the sidewalls 18 positions a central portion of the distal edge 23 at the projecting portion 22 on the sidewalls 18 further from the center axis 27 (FIG. 4) of the body 12 than the distal edges 23 of the sidewall 18 which are located adjacent the first edge 17 and second edge 19. This, as such, provides contact points at the central portions of the distal edge 23 defined by the projecting portions 22, which are further from the axis 27 and provide mechanical advantage in spreading the sidewalls 18 to enlarge the gap 14 when the body 12 of the clip is pushed onto a member or pipe 30 form the sandwiched engagement of the fabric 32 therebetween as in FIG. 5.

While not required, it is preferred that at one or both the first side edge 17 and second side edge 19 of the body 12 at the central portion 15 thereof positioned across from the gap 14 on the open end are formed at least one and preferably a second pair of projecting areas 26 each of which has formed a secondary ledge 28 underneath the curved second projecting areas 26. While, as noted, one such second projecting areas 26 will provide the user a secondary ledge 28 for one finger or a thumb to pull upward during removal. However, two opposing secondary ledges 28 for the opposing fingers and the thumb of the user, doubles the force employable during removal by pulling the body of the clip from the pipe 30 engagement shown in FIG. 5.

FIG. 3 shows an end view of the U-shaped body 12 and shows the axial passage 16 running through the clip 10. The diameter of the axial passage D1 between the interior surface 31 area on both sidewalls 18 is larger than a diameter of the gap 14 between the distal ends 23 at the sidewalls 18, shown as D2.

Currently, for example, the diameter of the axial passage D1 to engage upon a pipe with an exterior diameter of 2 inches would be 1.8 to 2 inches, whereby the clip 10 formed of flexible elastic material will impart a compressive, sandwiched engagement upon the a pipe 30 and fabric 32 when engaged thereupon as shown in FIG. 5.

In experimentation, to achieve a solid grip of the body 12 on a member such as a pipe 30 (FIG. 5), it has been found that forming the diameter D2 of the static or initial gap 14 between the distal edge 23 of the unflexed sidewalls 18 in a range between 40-60% smaller than the diameter D1 of the axial passage 16 works well to form and maintain this compressive engagement. The diameter D1 of this gap can be adjusted by lengthening the sidewalls 18 to curve more and place the distal ends 23 closer thereby decreasing the diameter D2 or shortening the sidewalls 18 to place the distal ends 23 thereof further apart, thereby increasing the diameter D2. As depicted in FIG. 3, the diameter D2 is a first diameter between the distal ends 23 of both sidewalls 18 prior to the sidewalls 18 being temporarily flexed or bent in a direction away from the gap 14 during installation as shown in FIG. 4A.

During that installation, the gap 14 reaches a temporary second diameter, which as noted will be substantially equal to or slightly larger than the depicted diameter D1 (FIG. 3) of the axial passage 16, since the pipe 30, to be engaged preferably, is slightly larger in diameter than D1 of the axial passage 16. By substantially is meant plus or minus 1-20 percent.

During installation to the engaged position of FIG. 5, a user pressing on the top portion of the body 12 such as the central portion 15 between the two secondary projecting areas 26, will cause a temporary deflection of the sidewalls 18 and flexing movement of both sidewalls 18, in a direction away from the gap 14 which causes a temporary increase in the diameter D2 of the gap 14. This temporary deflection is caused by force imparted against the distal edge 23 at the lower end 20 of both sidewalls 18 of the body 12 when in contact the pipe 30 and/or fabric 32 thereon as shown in FIG. 5. During this temporary deflection of both sidewalls 18, the gap 14 increases to a size equal to or slightly larger than the diameter D1 of the axial passage.

In this fashion, the clip body 12 is engageable around a pipe 30 having a diameter equal to or larger than that the diameter D1 of the axial cavity, when the pipe 30 is communicated through said gap 14 during the temporary deflection. Thereafter, the sidewalls 18 return to their original position having the original gap 14 therebetween having a diameter D2. Upon a cessation of the deflection, the sidewalls 18 return to their original or first position. This causes a contact of the interior surface 31 with the pipe 30 and with any fabric 32 placed adjacent the pipe 30 and thereby holds the clip body 12 on the pipe 30 along with maintaining the fabric 32 in contact with the pipe 30.

As noted, the distal edge 23 of the sidewalls 18 curving around the projecting portions 22 on the sidewalls 18 forms a wider spaced pair of angled planar surfaces depicted in FIG. 3 running in opposing angles. This provides mechanical advantage for the temporary deflection of the sidewalls 18 from their first or static position in a direction away from the gap 14 to form the temporary increase of the diameter D2 of the gap 14 to a second diameter which is of a size equal to or larger than the diameter D1 of the axial passage. As noted, during this temporary increase of the diameter D2, a pipe 30 can slip through the gap 14 and be compressibly engaged when the sidewalls 18 unflex and return to their original position which forms the diameter D2 of the gap 14 smaller than the diameter D1 of the axial passage.

This mechanical advantage provided by the configuration noted and the flexing of the body 12 and sidewalls 18 under force allows the user to place the gap 14 in the body 12 of the clip 10 on the fabric 32 and/or pipe 30 and simply press on the central portion 15 of the body 12 and used the mechanical advantage achieved to slide the body 12 into a compressive engagement around the exterior of the pipe 30 and concurrently form a compressive sandwiched engagement of any fabric 32 positioned between the interior surface 31 of the body 12 and the exterior of the pipe 30 as shown in FIG. 5. Forming the diameter D1 of the axial passage smaller than the diameter of the intended pipe 30 causes this compression which can be increased by decreasing D1.

Currently with the clip body 12 formed of a polymeric material such as nylon, or polypropylene, or polyethylene, or a similar elastic polymeric material, the body 12 has substantially 35 lbs of resistive force to the flexing of the sidewalls 18 from their static or first position, where D2 is the gap 14 diameter, to form a temporary enlargement of the gap 14 to a second diameter which is equal to or exceeding the diameter D2 of the axial passage 16, where the clip body 12 will slip on, or off, to or from the engaged position with a pipe 30 and fabric 32, as shown in FIG. 5.

This resistive force, and thus the compressive engagement, can also be adjusted by changing the thickness of the sidewalls 18 and central portion 15 and/or changing the material forming the body 12 of the clip 10. Currently forming the body 12 of a flexible material and of a thickness where this resistive force to bending the sidewalls 18 is between 20 to 50 pounds, to form a clip body 12 configured to hold fabric 32 to a member such as a pipe 30 in varying wind and other conditions, is preferred.

FIG. 4 shows a bottom side view of the clip 10, showing the open side of the body 12 formed by the gap 14. Also shown are the two projecting portions 22 which may be formed by curved sections of the sidewall 18 adjacent the distal ends 23 of the body 12 at a central area of the sidewall 18. Each such projecting portion 22 defines a ledge 21. As noted, while one such projecting portion 22 on one sidewall 18 forming one ledge 21 will aid in removal and engagement of the clip body 12 on a pipe 30, two such projecting portions 22 are preferred to give the user more leverage to remove the clip by providing two ledges 21. Further, two such projecting portions 22 will provide more leverage during engagement on the pipe 30 as noted herein.

Additionally, as shown in FIG. 4A, this leverage is enhanced by opposing angled ramps R1 and R2 formed on the distal end 23 of each of the two sidewalls 18. As can be seen, the projecting portions 22 form a deflection such as a curve in the sidewalls 18 and a downward lengthened positioning of the distal ends 23 in the area where the distal ends 23 intersect the projecting portions 22. This forms slanted portions and pairs of opposing angled ramps R1 and R2 or opposing angled contact surfaces of said distal edge 23 of each of the first and of the second of the two sidewalls 18.

As the user imparts force F, to the exterior surface of the body 12, forcing it toward a pipe 30, the opposing angled contact surfaces, defined by the formed ramps R1 and R2, are adapted to slide on the pipe 30 exterior and any fabric 32 placed thereon, and allow forced communication against the pipe 30 or fabric 32 thereon to act as a wedge. Thus, the opposing angled contact surface provided by the ramps R1 and R2 allow the pipe 30 to be engaged to wedge into the gap 14 and act with mechanical advantage to temporarily deflect the sidewalls and enlarge the gap 14 to a second diameter noted herein. Further, the opposing angled contact surface afforded by the ramps R1 and R2, in combination with the extra distance the distal edge 23 is separated from the axis 27 through the body 12, can both act in combination, to gain additional mechanical advantage for the user. This mechanical advantage, as noted, helps the user during installation, such as in FIG. 4A, to more easily temporarily deflect or bend the sidewalls 18 in a direction away from their first or static position on both sides of the gap 14, and thereby temporarily increase the size of the gap 14 to a second larger diameter.

During this process, as noted, the gap 14 increases in size from a static or first size diameter D2, where the sidewalls 18 are not bent or flexed, to the temporary and second diameter of the gap 14, will position the outwardly bent sidewalls 18 to form the gap 14 of a second diameter which is equal to or just slightly more than the diameter D1 (FIG. 3) of the axial passage 16. This diameter D1 of the axial passage 16, as noted, is adapted in size to be equal to or slightly smaller than the diameter of the intended pipe 30 for engagement. This causes the interior surface 31 of the body 12, once the sidewalls 18 return to the static or first diameter D1 of the gap 14, to grip the exterior surface of the pipe 30 and any fabric 32 thereon. This results in the body 12 of the clip holding the fabric 32 in a compressive sandwiched engagement between the interior surface 31 of the body 12 of the clip, and the exterior surface of the pipe 30.

Shown in FIG. 5, is a depiction of the clip 10 herein operatively engaged in a compressive engagement around a pipe 30, and forming a sandwiched compressive engagement of the fabric 32, in-between the interior 31 surface of the body 12 and sidewalls 18 thereof, and an exterior surface of the pipe 30.

While all of the fundamental characteristics and features of the clip securement system for fabric invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A clip, comprising:
   a body of said clip extending between a first side edge and a second side edge, said body having a central portion and having two sidewalls extending from said central portion between said first side edge and said second side edge, to respective distal edges of each of said two sidewalls;
   said body having a curved interior surface extending across said central portion and to said distal edges of said two sidewalls;
   said curved interior surface surrounding an axial passage communicating through said body from said first side edge to said second side edge;
   a projecting portion formed in each of said sidewalls in opposing positions thereon at a respective central area of each of said sidewalls located in-between said first side edge and said second side edge of said body;
   each said projecting portion defining a respective curved distal edge section, centrally located between two linear sections of a respective said distal edge of each of said sidewalls, said linear sections and said curved distal edge sections being positioned at opposing positions on each respective sidewall;
   a first gap running between said respective linear sections of said distal edges located in said opposing positions on each of said sidewalls;
   said axial passage having a first diameter;
   said first gap being smaller than said first diameter;
   said projecting portions defining opposing portions of said curved interior surface of each respective sidewall which extend to said respective curved distal edge sections, opposed portions of said curved interior surfaces having a separation distance therebetween, said separation distance exceeding the first gap;
   said two sidewalls being flexible for a temporary deflection, said temporary deflection forming a temporary increase of said first gap to a size substantially equal to or larger than said first diameter, whereby, said clip is engageable around a pipe communicated through said first gap during said temporary deflection and thereafter forms a contact of said interior surface with said pipe to hold fabric engaged thereon.

2. The clip as in claim 1 additionally comprising:
a first linear section of said two linear sections of each respective said distal edge of each of said sidewalls, extending along a line running between said first edge and one side of a respective said curved distal edge section;
a second linear section of said two linear sections of each respective said distal edge of each of said sidewalls, extending along a line running between said second edge and the other side of a respective said curved distal edge section; and
said first linear section of said distal edge being aligned with said second linear section of said distal edge; and
said curved interior surface of said projecting portion of said sidewall and said curved distal edge section both curving in a direction away from said gap.

3. The clip of claim 1 wherein said first gap is 40-60 percent of said first diameter.

4. The clip of claim 2 wherein said first gap is 40-60 percent of said first diameter.

\* \* \* \* \*